United States Patent
Mori et al.

[15] 3,690,230
[45] Sept. 12, 1972

[54] ELECTRONIC CIRCUITS FOR AUTOMATIC CAMERA CONTROLS

[72] Inventors: Chiharu Mori, Tokyo-to; Katsumi Ota, Fukuoka, both of Japan

[73] Assignee: Asahi Kogaku Kogyo Kabushiki Kaisha, Tokyo-to, Japan

[22] Filed: Oct. 30, 1970

[21] Appl. No.: 85,400

[30] Foreign Application Priority Data

Dec. 25, 1969 Japan ...................... 44/10331
Feb. 21, 1970 Japan ...................... 45/15079

[52] U.S. Cl. .............. 95/10 CT, 95/53 EA, 95/53 EB
[51] Int. Cl. ............................................... G01j 1/44
[58] Field of Search..95/10 CE, 10 CT, 10 CD, 53 E, 95/53 EA, 53 EB

[56] References Cited

UNITED STATES PATENTS

3,490,835  1/1970  Nemeth ................... 95/10 CE
3,470,798  10/1929  Miyakawa ............... 95/10 CT

*Primary Examiner*—Samuel S. Matthews
*Assistant Examiner*—Monroe H. Hayes
*Attorney*—Steinberg and Blake

[57] ABSTRACT

A camera provided with electronic circuitry for automatically determining the extent to which film in the camera is exposed. The electrical circuitry includes a photosensitive element for converting light intensity into a given electrical signal. Also, the electrical circuitry includes a closed loop circuit which forms that part of the electrical circuitry which determines the influence of the light intensity on the extent of the exposure of film which is automatically obtained. This closed loop circuit enables the exposure to be obtained in part according to the light intensity without any influence from the particular characteristics of the photosensitive element.

10 Claims, 6 Drawing Figures

INVENTORS
CHIHARU MORI
KATSUMI OTA
BY Steinberg and Blake
ATTORNEYS

ELECTRONIC CIRCUITS FOR AUTOMATIC CAMERA CONTROLS

BACKGROUND OF THE INVENTION

The present invention relates to cameras.

In particular, the present invention relates to cameras which are designed to determine exposures automatically.

Thus, there are well known cameras which measure the intensity of the light. These cameras may be preset so as to provide a predetermined exposure aperture by way of the adjustable diaphragm of such a camera. Also, a suitable adjustment is made in accordance with the speed of the film which is within the camera to be exposed therein. In accordance with these factors, namely the factors of light intensity, diaphragm setting, and film speed, electronic structures, which are well known, are capable of automatically determining the exposure time so that a proper exposure of the film will be made in a fully automatic manner in accordance with these variables.

Thus, a proper exposure time is achieved by operating photographically with the above three factors, in accordance with the relationship:

$$T_V = B_V + S_V - A_V \quad (1)$$

where $T_V$, $B_V$, $A_V$ and $S_V$ are respectively representative of the exposure time, the light intensity, the diaphragm aperture, and the film speed, these factors being given in a series of multiples (i.e., in apex indication), so that the appropriate exposure time $T_V$ will correspond to that value which will achieve a proper exposure.

Structure for operating according to formula (1) may include electronic circuitry, although the operating mechanism may be partly mechanical or an optical operating section may be included. In this way the exposure time is controlled by electronic control of the camera shutter.

In utilizing such structure for electronic shutter control, the intensity of the light at the object which is photographed, which is to say the intensity of the light received by the camera must be converted by a suitable photosensitive means into an electrical signal. If the photosensitive means is made of cadmium sulfide, the following relationship applies:

$$R = k I^{-\gamma} \quad (2)$$

where $I$ is indicative of the intensity of the light impinging on the photosensitive element, $R$ is representative of the internal resistance of the photosensitive element, and $k$ and $\gamma$ are inherent or intrinsic constants of the photosensitive element. Where the electronic circuitry controlling the shutter uses a photosensitive element having characteristics in accordance with formula (2), it is essential that an appropriate electrical signal be obtained in proportion to the light intensity I on the effective surface area of the photosensitive element. In other words, it is required that the light intensity on the effective surface area by in an appropriate proportion to the converted amount of electricity where the characteristic of the photosensitive element is expressed as $\gamma \approx 1$.

In known electronically controlled shutter assemblies, a photosensitive element of $\gamma \approx 1$ is used, or a fixed resistor is connected in series or in parallel with the photosensitive element so as to establish $\gamma \approx 1$. With such an arrangement, however, it is difficult to establish $\gamma \approx 1$ relative to the light intensity where the latter varies over a considerable range.

It has also been proposed to provide a logarithmic compression element such as a diode connected in series with the photosensitive element which has characteristics according to formula (2), so as to convert the impinging light intensity, which varies in the manner of exponential function, into a linear voltage of which the gain is, in turn, properly established by a variable gain amplifier, so that in this way the value of $\gamma$ is adjusted while operation according to formula (1) is brought about with the resulting linear voltage. Such electronic circuitry for controlling a shutter is conveniently referred to as electronic control circuit means of the logarithmic compression-extension type, for controlling the camera shutter.

As is apparent from the above consideration, it is relatively easy to adjust the value of $\gamma$, to operate according to formula (1) and to establish the requirement $\gamma \approx 1$, with respect to light intensity which impinges on the photosensitive element and varies over a considerably wide range, since such operations are possible by way of the linear voltage achieved after logarithmic compression.

However, such arrangements are disadvantageous particularly with respect to controls for achieving great precision and high quality, in that a temperature compensation for the electronic circuitry is difficult to achieve inasmuch as the so-called input signal (the intensity of the impinging light, the selected value of the diaphragm aperture, and the film speed) is subjected to logarithmic compression and the temperature dependency of the semiconductors included in the circuitry, such as transistors and diodes, cannot be neglected with respect to the signal voltage which is subjected to the logarithmic compression.

While the above considerations are applicable to cameras in general, it is particularly desirable to apply electronic circuitry for automatic shutter control to single lens reflex cameras, particularly of the type utilizing the so-called TTL system, according to which light impinges on the photosensitive or photoconductive element only after having traveled through the objective of the camera. With such arrangements the photoconductive element is coupled through an amplifier to a transistor so that the current which is obtained is in inverse proportion to the internal resistance of the photoconductive element, with the obtained current depending upon the photo input from the object which is to be photographed. The particular current value is retained for a given period of time, and another current value is determined in accordance with the selected or preset diaphragm aperture and the film speed. These currents are subjected to logarithmic compression, respectively, then to photographic operations and finally to logarithmic extension in differential operator circuits, each of which uses a linear voltage as its input. A capacitor is then charged with a constant current which is the output current of the differential operator circuits, and the time required for the terminal voltage of the capacitor to reach a predetermined value is used to determine the magnitude of the exposure time.

Electronic circuits for automatically controlling a shutter in cameras of this general type have a light-measuring or photometering section which includes the photosensitive or photoconductive element, a logarithmic compression element, and an amplifier, and then there is an additional section for setting the selected diaphragm aperture and the film speed into the electronic circuitry by adjusting a suitable variable resistor so as to convert the selected diaphragm aperture and film speed into an electrical signal, with the use of a logarithmic compression element and an amplifier, the photometering section being coupled to this second section in a mutually differential manner. The gain of the amplifier included in each of these sections is established so that the characteristic of each section may satisfy the photographic operations which are automatically carried out with linear voltage, the result of the photographic operations being stored into a capacitor and then a timing capacitor is charged with a constant current by a logarithmic extension circuit of a high input resistance type, which serves to provide a constant-current charge circuit with the current being in proportion to the amount of light which is received by the camera. These operations are carried out in synchronism with the operation with the shutter which in the usual single lens reflex camera includes a leading curtain which moves from a closed to an open position in order to start the exposure and the running of the shutter. A suitable switching circuit such as a Schmitt trigger circuit is inserted into the electronic circuitry so as to control the instant at which the trailing curtain follows the leading curtain so as to terminate the exposure.

With circuitry of the above type, the input signals correspond to factors such as the light intensity, the diaphragm aperture, and the film speed, and these signals are converted into electrical signals and are subjected to the logarithmic compression so as to be treated according to a linear voltage. The result is that the input signals are, due to the circuitry, far lower or smaller in magnitude than the bias voltage or the offset voltage, and the circuit is of a multistage cascade arrangement, resulting in exceedingly strict requirements with respect to possible unevenness in the characteristics of the elements, to achieve a proper temperature characteristic and stabilization of the voltage source of the circuit. These requirements have resulted in serious problems in the production of circuitry of the above type.

SUMMARY OF THE INVENTION

It is accordingly a primary object of the present invention to provide for cameras electronic circuitry capable of automatically providing a proper exposure while avoiding all of the above drawbacks.

It is in particular one of the objects of the present invention to provide an electronic circuitry which is capable of operating in a manner independent of the characteristics of the photosensitive means.

Thus, it is an object of the present invention to provide an electronic circuitry which will eliminate the problems encountered in connection with temperature characteristics and source voltages of the circuits.

Thus, it is an object of the present invention to provide an electronic circuitry which is exceedingly stable in its operation.

Also, it is an object of the invention to provide a structure which is highly suitable for mass production particularly as a result of the fact that the instability or lack of precision resulting from characteristics of the photosensitive means are eliminated.

Yet another object of the present invention is to provide electronic circuitry which is particularly adapted for use with cameras which do not utilize light which has passed through the objective for determining the signal according to the light intensity.

However, it is also an object of the present invention to provide a construction which is particularly suited for use with single lens reflex cameras where the photosensitive means receives light which has passed through the objective.

According to the invention the camera is provided with an electrical circuit means capable of automatically determining the extent to which film in the camera is exposed. A photosensitive means is operatively connected to and forms part of the electrical circuit means for introducing into the latter an electrical signal according to the light intensity. A closed loop circuit means also forms part of and is operatively connected with the electrical circuit means for controlling the electrical circuit means to determine the exposure in part according to the light intensity without being influenced by the characteristics of the photosensitive means.

BRIEF DESCRIPTION OF DRAWINGS

The invention is illustrated by way of example in the accompanying drawings which form part of this application and in which.

DESCRIPTION OF PREFERRED EMBODIMENTS

With the circuitry of the present invention, the electronic shutter control is achieved with a high degree of precision and stability by utilizing in the electrical circuit means of the invention a suitable combination of a logarithmic compression circuit and an automatic control circuit of the closed loop type in such a manner that this combination brings about a circuit through which correction of the γ value as well as the photographic operations may be performed in a manner overcoming the above drawbacks, while utilizing electronic shutter control structure of the logarithmic compression-extension type.

Figure 1:
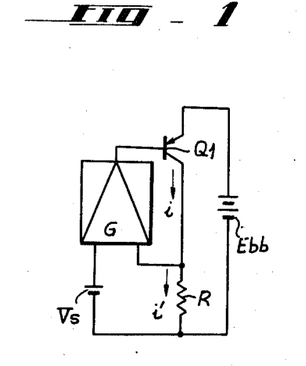
FIG. 1 is a schematic representation of an electronic circuit which demonstrates the principle of the invention.

Referring first to FIG. 1, there is illustrated therein the principle upon which is based an automatic control system of the closed loop type, this circuit operating to control the collector current $i$ of a transistor $Q_1$ according to an optional value. In FIG. 1 the amplifier G has high input resistance and has a voltage gain $G_r$, the circuitry including the detecting resistor R and a source of reference voltage $V_s$ corresponding to the command of the automatic control system of the closed loop type. The circuit includes a voltage source $E_{bb}$. The fact that the amplifier G is of a high input resistance establishes the relation $i \approx i'$, where $i$ is the collector current of the transistor $Q_1$ and $i'$ is the current flowing through the detecting resistor R.

Assuming that the circuitry of FIG. 1 comprising the transistor $Q_1$ and the detecting resistor R (having the resistance value $r$) has the voltage gain $G_v'$, the following relationship applies:

$$ir \doteq i'r = \frac{G_v G_v'}{1 + G_v G_v'} V_s \qquad (3)$$

If the value of $G_v$ is established so that in formula (3) the requirement $|G_v G_v'| \gg 1$ is established, $$ir \approx V_s. \qquad (4)$$

According to formula (4), a suitable selection of the detecting resistor R and the reference voltage $V_s$ permits the current $i$ to be automatically controlled at an optional value.

Figure 2:
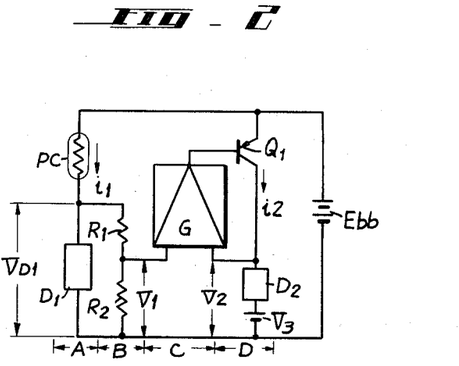
FIG. 2 is an illustration of electronic circuitry illustrating the principle of the invention in connection with a photosensitive means.

FIG. 2 illustrates the principle upon which the circuitry of the present invention is based. FIG. 2 shows the photosensitive means PC having characteristis according to formula (2), and made, for example, of cadmium sulfide. The circuitry includes a logarithmic compression section A made up of the logarithmic compression element $D_1$ such as a diode and the photosensitive means PC. A $\gamma$ adjusting section B consists of the resistors $R_1$ and $R_2$ which respectively have resistance values $r_1$ and $r_2$. The current flowing through these resistors $R_1$ and $R_2$ is negligible with respect to the current $i_1$ flowing through the photosensitive means PC. In other words, the circuit is arranged in such a way that the current flowing through the diode $D_1$ may be considered as $i_1$.

The circuitry also includes a logarithmic extension section D which is made up of the transistor $Q_1$, a logarithmic compression element $D_2$, and a bias voltage source $V_3$ having the voltage $V_3$ for adjusting the collector current $i_2$ of the transistor $Q_1$. These components $Q_1$, $D_2$, and $V_3$ are all connected in series. It is to be noted that the logarithmic compression element $D_2$ and the bias source $V_3$ constitute a detecting section for the collector current $i_2$. The amplifier G of high input resistance type serves as a negative feedback amplifier section C for controlling the collector current $i_2$ of the transistor $Q_1$.

Assuming that $V_{D1}$ is indicative of the terminal voltage of diode $D_1$, that $V_1$ is indicative of the terminal voltage of resistor $R_2$, that $V_2$ is indicative of the sum of the terminal voltages of the logarithmic compression element $D_2$ and the bias voltage $V_3$, and that $E_{bb}$ is indicative of the voltage source, the following relationship is established in the logarithmic compression section A:

$$V_{D1} \approx K_1 \gamma \log I + K_2, \qquad (5)$$

where $K_1$ and $K_2$ are constants. This formula (5) introduces the following relation which is established in the $\gamma$ adjusting section B:

$$V_1 \doteq \frac{K_1 \gamma}{1 + \beta} \log I + K_3 \qquad (6)$$

where $K_3$ is a constant and $\beta = r_1/r_2$. In the logarithmic extension section D, the following relation is established:

$$V_2 \approx K_4 \log i_2 + K_5 + V_3, \qquad (7)$$

where $K_4$ and $K_5$ are constants.

According to the operating principle of the closed automatic control system, the following relation is established from the formulas (6) and (7), provided that the gain of the amplifier G is set so as to establish a relation $V_1 \approx V_2$:

$$i_2 \doteq K_6 I \frac{K_1 \gamma}{K_4(1+\beta)} \qquad (8)$$

where $K_6$ is a constant. If the value of $\beta$, $i$, $\gamma$, $r_1/r_2$ is set so that there is the relation:

$$\beta = (K_1 \gamma - K_4)/(K_4) \qquad (9)$$

then, $$i_2 \approx K_6 I \qquad (10)$$

Thus, a current $i_2$ in proportion to the intensity of the light impinging on the photosensitive means is obtained. If the impinging light intensity $I$ is constant, the terminal voltage $V_1$ of the resistor $R_2$ is constant, and, accordingly, the logarithmic compression element $V_2$ also is constant ($V_2 \approx V_1$), while, if the bias voltage $V_3$ varies in linear form, the collector current $i_2$ of the transistor $Q_1$ must vary in the manner of an exponential function, as is obvious from the formula (7). Series application of the linear voltage according to the variation of the setting of the diaphragm aperture and the film speed used in a series of multiples on the bias voltage $V_3$ results in carrying out with the electronic circuitry the photographic operations according to formula (1). Therefore, the collector current $i_2$ of the transistor $Q_1$ is a current value in accordance with the exposure time.

Compensation of the temperature characteristics may be brought about only between the diode $D_1$ and the logarithmic compression element $D_2$, including the bias voltage $V_3$. Moreover, the amplifier G and the transistor $Q_1$ are included in the closed loop. Therefore, these components will simply find their operating levels within a predetermined range. Thus, with the device of the invention it is possible to improve in a highly outstanding manner conventional electronic circuitry of the logarithmic compression-extension type, for controlling the shutter of a camera.

Figure 3:
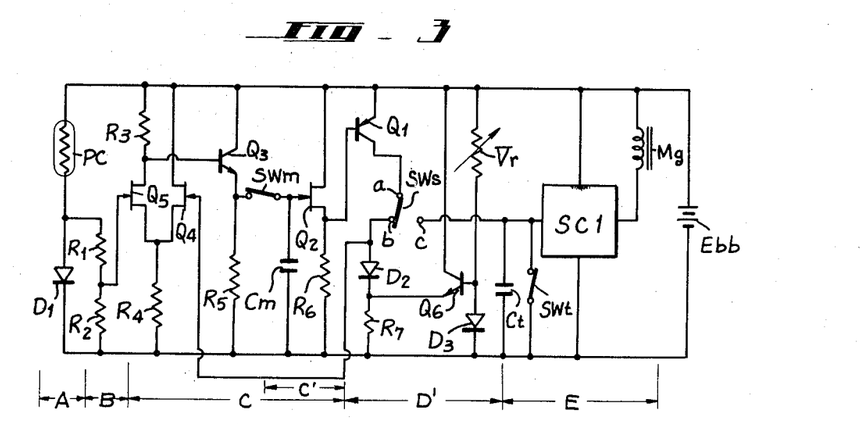
FIG. 3 is a wiring diagram of electronic circuitry of the invention used for a single lens reflex camera.

FIG. 3 illustrates details of an embodiment of the invention incorporated into a single-lens reflex camera having a quick-return mirror mechanism and employing a so-called TTL opening photometering system, or in other words a through-the-lens light-measuring or photometric system where the light passes through the objective to be thereafter measured, with the diaphragm open and thus achieving automatic electronic control of the exposure time.

Referring to FIG. 3, the circuitry includes the photosensitive means PC having characteristics in accordance with formula (2). This photosensitive means is arranged in the camera in such a way that the light reflected from the mirror, after having passed through the objective, will impinge on the photosensitive means. This photosensitive means PC and a logarithmic compression element $D_1$ connected in series therewith, form the logarithmic compression section A, while the resistors $R_1$ and $R_2$ form $\gamma$ adjusting section B of the illustrated circuit.

A logarithmic compression-extension and operator section D' is made up of components which include the transistors $Q_1$ and $Q_6$, logarithmic compression elements $D_2$ and $D_3$, resistor $R_7$, and variable resistor $V_r$, with the single-pole double-throw switch $SW_s$ assuming its normally closed position closing the circuit across the contacts $a$ and $b$. The variable resistor $V_r$ has a characteristic according to which the resistance value thereof varies in the form of an exponential function according to the conversion of the particular diaphragm aperture and the film speed into an electrical signal. In other words in a known manner the setting of the diaphragm and the setting of the film speed into the camera will provide for the variable resistor $V_r$ a particular resistance value which varies in the form of an exponential function as set forth above. This resistance value is adapted to give the terminal voltage of resistor $R_7$ a linear voltage variation under the action of the logarithmic compression element $D_3$. It is to be noted that a manual mechanism for setting the diaphragm aperture may be the known mechanism providing a so-called preset diaphragm, as is conventional in single lens reflex cameras.

The circuitry further includes a negligible feedback amplifier section C made up of components such as the electrical field effect transistors $Q_2$, $Q_4$ and $Q_5$, an additional transistor $Q_3$, resistors $R_3$, $R_4$, $R_5$ and $R_6$, and a storage capacitor $C_m$ with the normally closed switch $SW_m$. The negligible feedback amplifier section C includes a holding circuit section C' necessary for storage of the intensity of the light impinging on photosensitive means PC as an electrical magnitude before the mirror is snapped up beyond the optical axis, since, during photographing operations, the light which impinges on the photosensitive means PC for control of the exposure time is interrupted by the upward movement of the mirror.

The circuitry of FIG. 3 further includes a timing circuit section E made up of components such as the capacitor $C_t$, the normally closed switch $SW_t$, the Schmitt trigger circuit $SC_1$, the electromagnet $M_g$, and the switch $SW_s$ normally closed across the terminals $a$ and $b$, as pointed out above. Thus, this latter switch may be considered as forming part of both of these sections D' and E. The electromagnet $M_g$ is energized prior to release of the shutter for making an exposure, and as is well known the camera of the single lens reflex type is provided with a focal plane shutter having leading and trailing curtains. The leading curtain moves from its rest to its open position, in order to start the exposure, and the energized electromagnet $M_g$ functions to retain the trailing curtain in its initial position, so as to maintain the shutter open. Upon deenergizing the electromagnet $M_g$, as a result of the operation of the timing circuit section E, the trailing curtain is released to a spring, for example, so that it then follows the leading curtain so as to close the shutter and terminate the exposure.

Thus, the electronic circuit means of the invention which is illustrated in FIG. 3 includes the illustrated power source $E_{bb}$ as well as the several circuit sections A, B, C, D' and E, and the above requirements described in connection with FIG. 2 are established between the diodes $D_1$, $D_2$ and the resistors $R_1$, $R_2$. The relationship between the switches $SW_m$, $SW_s$, $SW_t$ and the camera mechanism is such that the switch $SW_m$ is opened and closed in operative association with the quick-return operation of the mirror. Thus a known mechanism will provide for opening of the switch $SW_m$ just prior to snapping of the mirror up beyond the optical axis so that the light passing through the objective can then reach the focal plane. The switch $SW_s$ has its position normally closing the circuit between the terminals $a$ and $b$. Also, as a result of the operation of the quick-return mirror mechanism, a known structure brings about operation of the switch $SW_s$ just after the switch $SW_m$ is opened in such a way as to open the circuit between the terminals $a$ and $b$ so as to close the circuit across the terminals $a$ and $c$, with this latter operation taking place just prior to movement of the leading curtain to the open position for starting the exposure. The switch $SW_t$ assumes its illustrated normally closed position during transportation of the film and is operatively connected with the structure which operates the leading curtain so that opening of the switch $SW_t$ takes place through a known mechanism in synchronization with the movement of the leading curtain. Thus, when the leading curtain moves from its rest position so as to open the shutter and start the exposure the switch $SW_t$ also opens.

The circuitry illustrated in FIG. 3 and described above operates in the following manner:

The switches $SW_m$, $SW_t$ and $SW_s$, are all initially in their normally closed positions illustrated in FIG. 3. The selected diaphragm setting is set into the camera so as to provide a selected aperture size, and through a suitable mechanism the particular speed of the film which is in the camera is also set into the camera This will result in a known way in a particular setting of the variable resistor $V_r$, as pointed out above. The light intensity registers at the photosensitive means PC, and the result is that the collector current $i_2$ of the transistor $Q_1$ is a current value in accordance with the proper exposure time based upon the principle described above in connection with FIG. 2.

With the camera in this condition, the shutter-operating button, plunger or the like, is actuated by the operator so as to start the operations which result in tripping of the shutter to make the exposure. As is well known in the case of a single lens reflex camera, prior to opening of the shutter the actuation of the shutter release will firs snap the mirror up beyond the optical axis so that the light can continue to travel from the objective to the film plane instead of being directed up to the viewfinder. The mechanism which functions to snap the mirror up to its inoperative position will first automatically open the switch $SW_m$, and the result is that the terminal voltage of storage capacitor $C_m$ is held as a result of the high input resistance characteristics of the gates of the storage capacitor $C_m$ and the electrical field effect of transistor $Q_3$, so that the collector current $i_2$ is held constant. In this way a holding or retaining circuit means is provided and forms part of the electrical circuit means of the invention.

When the mirror is snapped up, the switch $SW_s$ is automatically moved so as to open the circuit between terminals $a$ and $b$ and close the circuit between terminals $a$ and $c$. This actuation of the switch $SW_s$ takes place just prior to movement of the leading curtain of the focal plane shutter to the open position when the exposure starts. As was pointed out above, the switch $SW_t$ will then open automatically in synchronism with the movement of the leading curtain, and the result is that the timing capacitor $C_t$ is charged with a constant current by the constant collector current $i_2$ of the transistor, this latter current having previously been held by the holding or retaining circuit means as pointed out above. The charging of the capacitor $C_t$ continues in this way until the terminal voltage thereof reaches a predetermined level, and the Schmitt trigger circuit $SC_1$ will automatically respond to reaching of this predetermined level of charge by the capacitor means $C_t$ so as to automatically deenergize the electromagnet $M_g$, in a known way, thus releasing the trailing curtain so that it is driven to follow the leading curtain and thus terminate the exposure with a proper exposure time having been provided through this circuitry of the invention.

Figure 4:
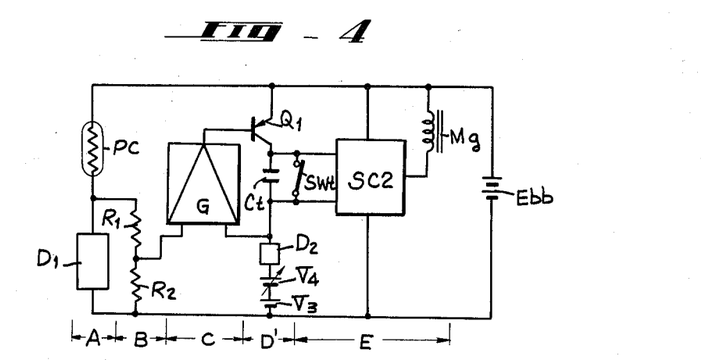
FIG. 4 is a wiring diagram of electronic circuitry used for a camera where the photosensitive means receives light which does not pass through the objective.

FIG. 4 illustrates another embodiment of the invention where the timing circuit section E of the electrical circuit means of the invention includes, in accordance with the principles described above in connection with FIG. 2, the timing capacitor $C_t$, the Schmitt trigger switching circuit $SC_2$, the magnet $M_g$, and the switch $SW_t$. When the latter switch opens, this section E is connected with the logarithmic extension and operating section D' of the preceding stage of the circuit, as illustrated, and in this way a suitable linear voltage $V_4$ is applied to the circuit forming the logarithmic extension section and including the collector current $i_2$ of the transistor $Q_1$ which is in series with the diode $D_2$ and the source of bias voltage $V_3$. The variable resistor $V_4$ corresponds to the variable resistor $V_r$ and is set at a given resistance value according to the selected setting of the diaphragm aperture and the film speed, these values being introduced in a series of multiples so as to be applied to the circuit of the collector current $i_2$ of the transistor $Q_1$ in series to the diode $D_2$ and the bias voltage $V_3$. It is to be noted that several components of FIG. 4, the electrical magnitudes, and the other elements are designated by the same reference characters as those used in FIG. 2 since they have the respective functions which are the same as those of FIG. 2 and which have already been described above. Although the electrical circuit means of the invention as described above in connection with FIG. 3 has been shown in the case of FIG. 3 as used with a single-lens reflex camera, the electronic means of the invention is particularly of value with a so-called electronic shutter control system of the off-the-lens photometering type, which is to say in a camera where the photosensitive means is exposed to light which does not pass through the objective.

It is this latter type of device which is illustrated in FIG. 4. In FIG. 4 the single switch means $SW_t$ is operatively connected with the shutter actuating mechanism, which in this case is a between-the-lens shutter, so as to be closed when the camera shutter is closed and so as to open in synchronism with the opening of the shutter. Such a mechanism for operating a switch in synchronism with the shutter is well known. The circuit requirements of FIG. 4 are identical with those described above in connection with FIG. 2, and the circuitry of FIG. 4 is based upon the same principles as those of FIG. 2, as is apparent from a comparison of FIG. 4 with FIG. 2.

With the switch $SW_t$ closed, the diaphragm is set at a selected aperture and the film speed has been introduced into the camera and these values may be chosen in accordance with the intensity of the illumination of the object which is photographed. The introduction of these values will set the bias voltage $V_4$, in the same way that the selected diaphragm setting and film speed control the setting of the variable resistor $V_r$. Thus, the collector current $i_2$ of the transistor $Q_1$ is automatically determined so as to provide a signal for achieving a proper exposure time.

Upon opening of the camera shutter to start an exposure, the switch $SW_t$ is simultaneously opened, so that switch no longer bypasses the capacitor means $C_t$, and now the timing capacitor $C_t$ is charged with a constant current, namely the current $i_2$, until the terminal voltage of the capacitor $C_t$ reaches the predetermined level at which the Schmitt trigger $SC_2$ responds so as to deenergize the electromagnet $M_g$ and thus permit the shutter to close so as to terminate the exposure. As is understood, the shutter will be held in its open position by the energized electromagnet $M_g$ which acts by way of suitable mechanism well known in the art to hold the shutter open until the electromagnet is deenergized in the above manner so as to release the shutter to assume automatically its closed position, terminating the exposure. In this way the shutter is actuated so as to provide a predetermined exposure time in a fully automatic manner in accordance with the features of the invention discussed above.

In the particular embodiment which is illustrated in FIG. 4, the collector characteristic of the transistor $Q_1$ is utilized for the constant current charging of the timing capacitor $C_t$. In actual practice, however, the collector-emitter voltage $Vc_E$ of transistor $Q_1$ drops as the terminal voltage of capacitor $C_t$ rises, so that an absolutely perfect constant current charging cannot be achieved. However, particularly in the embodiment of FIG. 4, an exposure time of extremely high precision and stability is obtained since an automatic control of the closed loop type is always carried out. Although the embodiment of FIG. 3 utilizes the single-pole double-throw switch $SW_s$, such a switch of the single-pole double-throw type is not preferred for a camera which ideally requires an arrangement to achieve light weight and small size, because cameras must be carried about and are often used while traveling. Therefore, it is preferred to provide for the camera an exceedingly small number of switches, and it is apparent that the embodiment of FIG. 4 is far more effective from this viewpoint since the embodiment of FIG. 4 requires only the single switch $SW_t$.

As is apparent from the above description the embodiment of FIG. 4 has an electrical circuit means of the present invention which is particularly suitable for mass production as a result of the fact that a photosensitive means of optional γ may be used, and at the same time a proper exposure time is achieved with a high degree of precision and stability. The above description of the embodiment of FIG. 4 has been based on the assumption that light measurement away from the objective is used, but the very same structure can be incorporated also into a single-lens reflex camera in connection with which the embodiment of FIG. 3 has been described, if a holding circuit structure such as the holding circuit section C' of FIG. 3 is situated in the part of the circuit which forms the amplifier G of FIG. 4.

It is apparent that the circuitry described above solves the problem of the difficulties encountered in the temperature compensation, as are unavoidably present in conventional electronic shutter control devices of the logarithmic compression-extension type where a plurality of semiconductors are connected in a so-called open loop circuit. The structure of the invention is incorporated into an electronic shutter control device where a closed loop control is carried out until the determination of the exposure time has been completed, so that the control of the proper exposure time is achieved in a manner which is far more stable than in conventional control mechanisms of the open loop type, and at the same time a photosensitive means of optional γ may be used. It is apparent, therefore, that the structure of the invention is particularly suitable for mass production.

As has been pointed out above, the structure of FIG. 3 has certain disadvantages in connection with single-lens reflex cameras, particularly with respect to the particular switching arrangements shown in FIG. 3.

Figure 5:
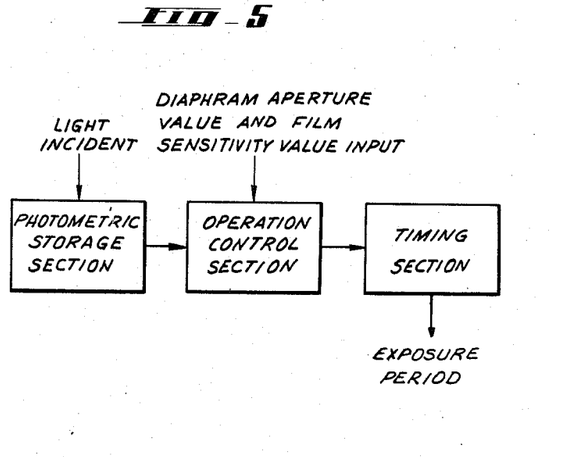
FIG. 5 is a block diagram representing an arrangement according to the invention to be used for a single lens reflex camera.
Figure 6:
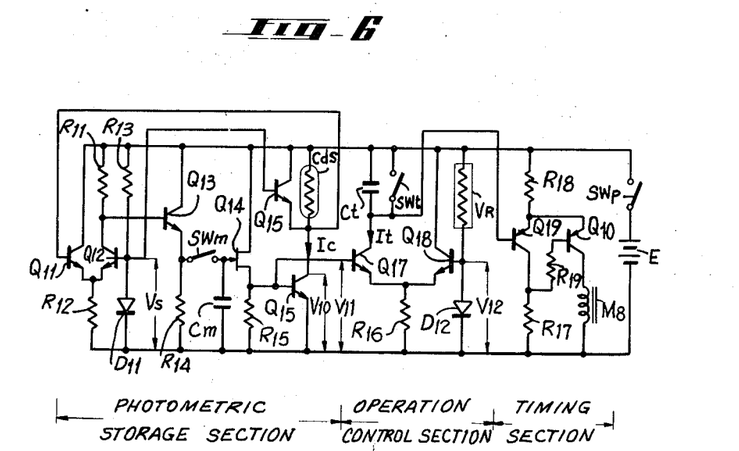
FIG. 6 is a wiring diagram showing details of the block diagram of FIG. 5.

FIG. 5 and 6 illustrate an embodiment of the invention which is particularly advantageous for use with single lens reflex cameras.

Thus, with the embodiments of FIGS. 5 and 6 it is possible to apply the invention to an electronic control circuit means to control the shutter of a single-lens reflex camera utilizing a through-the-lens photometering system, or in other words in a single-lens reflex camera of the so-called TTL type. In such a camera the photosensitive means is in the form of a photoconductive element coupled through an amplifier to a transistor so that the current which is obtained is in inverse proportion to the internal resistance of the photoconductive element, in accordance with the photo-input from the object which is to be photographed. This particular value of the current is retained for a certain interval and there is another current value determined in accordance with the setting of the diaphragm and the film speed. These values are subjected to logarithmic compression, and then to certain photographic operations, and subsequently to logarithmic extension in differential operator circuits each using linear voltage as its input. A capacitor is charged with a constant current, which is the output current of the differential operator circuits. The time required for the terminal voltage of the capacitor to reach a predetermined value is used to determine the exposure time.

There are already proposed circuits for such cameras where the photometering section includes a photoconductive element, a logarithmic compression element, and an amplifier, while a second section is provided for setting the value of the diaphragm aperture and the film speed into the circuit, by utilizing a variable resistor which converts the diaphragm setting and film speed value into an electrical magnitude or signal, this section having a logarithmic compression element and an amplifier, and the photometering section is coupled with this second section in a mutually differential manner. The gain of the amplifier included in each section is established in such a way that the characteristic of each section will satisfy the photographic operations which are automatically carried out with a linear voltage, the result of this photographic operation being stored in a capacitor, whereupon a timing capacitor is charged with a constant current by a logarithmic extension circuit of high input resistance, serving as a constant-current charging circuit with the current being in proportion to the amount of light impinging on the photosensitive means, and this operation of charging the timing capacitor is carried out in synchronism with the opening of the shutter, or in other words with the movement of the leading curtain of the focal plane shutter to a shutter-opening position, while a switching circuit, such as a Schmitt trigger circuit is included in the electrical circuit means so as to determine the instant at which the trailing curtain is released to close the shutter and terminate the exposure. With conventional circuits of this type, the input signals correspond to the factors such as the intensity of the light at the subject which is to be photographed, the setting of the diaphragm aperture, and the film speed. These input signals are converted into electrical signals and subjected to the logarithmic compressions so as to be treated as a linear voltage. Therefore, the input signals are, due to the arrangement of the circuit, far lower than the bias voltage or the offset voltage, and the circuit system forms a multistage cascade arrangement, resulting in the necessity of strict requirements as a result of possible unevenness in the characteristics of the several elements to achieve a better temperature characteristic and stabilization of the voltage source of the circuit. The latter requirements have proved to be serious problems in the production of the circuitry.

With the embodiment of FIGS. 5 and 6, an automatic control circuit of the closed loop type is used in the photometric storage section where problems have often been encountered, while differential circuits of a balanced type are utilized in the operation control circuit section, and through an effective combination of these circuit features a substantial improvement in the temperature dependency and voltage source dependency is achieved with the invention, while with previously known circuitry these factors have resulted in creation of many problems which up to the present time have not been solved. With the present invention there is a remarkable improvement in the stability of the circuit system as well as in the capability of mass producing the circuitry.

Referring to FIG. 5, there is shown therein a block diagram illustrating the circuitry of the electrical circuit means of the invention. This circuit means includes the photometric storage section, an operation control section, and a timing section. FIG. 6 shows the details of the embodiment of FIG. 5.

The photometric storage section functions so as to provide, by closed loop automatic control, a current which is in inverse proportion to the internal resistance of the photoconductive element which may be a cadmium sulfide element and which in turn depends upon the photo-input, or in other words the intensity of the light traveling through the objective from the object which is to be photographed. This photometric storage section functions to retain this current and to obtain an input voltage by subjecting this current to a logarithmic compression.

The details of the photometric storage section are illustrated in FIG. 6. FIG. 6 illustrates the voltage $V_{10}$ across the collector and emitter of control transistor $Q_{15}$, which is connected in series with the photosensitive means CdS. $V_s$ represents the terminal voltage of diode $D_{11}$ connected in series with resistor $R_{13}$. The illustrated closed loop circuit means of the electrical circuit means shown in FIG. 6 achieves an operation according to which over the photo-input range or the range within which the internal resistance of the photosensitive means CdS varies, the relationship $V_s \approx V_o$ may always be established in an amplifier which includes transistors $Q_{11}$, $Q_{12}$, $Q_{13}$, the electrical field effect transistor $Q_{14}$ and resistors $R_{11}$, $R_{12}$, $R_{14}$, and $R_{15}$, using the voltages $V_s$ and $V_{10}$ as a reference voltage and a controlled voltage, respectively. After the current in inverse proportion to the internal resistance of the photosensitive means is obtained as the collector current $I_c$ of the control transistor $Q_{15}$, a memory switch $SW_M$ is transferred from the closed to the open position and in this way the collector current is maintained constant regardless of variation in the internal resistance of the photosensitive means, under the effect of storage capacitor $C_M$ and the electrical field effect transistor $Q_{14}$.

In order to render this latter operation more stable, a switching transistor means $Q_{16}$ is connected in parallel with the photosensitive means in such a way that the switching transistor means $Q_{16}$ is in a non-conductive state when $V_s = V_{10}$, while transferring to a conductive state when the difference between the reference voltage $V_s$ and the controlled voltage $V_{10}$ exceeds the threshold value, so as to stabilize in this way the operation of the control transistor $Q_{15}$. If the voltage $V_{11}$ across the base and emitter of control transistor $Q_{15}$, obtained through the above operation, is utilized by the photometric storage section as the output voltage thereof, this output voltage will be a linear voltage with respect to the variation of the photo-input from the object which is to be photographed in the form of an exponential function.

The operation control section shown diagrammatically in FIG. 5 and in detail in FIG. 6 operates to carry out a photographic operation according to which the photo-input value of the light from the object to be photographed, the magnitude of the diaphragm aperture, and the speed of the film are used as variables with a linear voltage to obtain in this way a charging current for the timing capacitor.

The operation control section of the electrical circuit means of the invention illustrated in FIGS. 5 and 6 operates as follows:

FIG. 6 illustrates the terminal voltage $V_{12}$ of the logarithmic compression element $D_{12}$ which is connected in series with the variable resistor $V_R$. This latter resistor is set at a value in accordance with the selected diaphragm aperture and the speed of the film. The photometric storage section has an output voltage $V_{11}$. These voltages $V_{11}$ and $V_{12}$ are the input voltages for a pair of differential circuits of the emitter coupling type formed by transistors $Q_{17}$ and $Q_{18}$ as well as by resistor $R_{16}$. The collector current of the transistor $Q_{17}$ varies according to the linear variation of the input voltage in the form of an exponential function. Therefore the characteristic of the photosensitive means or of the variable resistor which is set according to the diaphragm aperture and film speed, and the illustrated circuit arrangement, may be properly selected so that the relation between the values of the photo-input from the object to be photographed, the diaphragm aperture, the film speed, and the exposure time can be determined according to apex indices in order to obtain the charging current for timing purposes as the output current $I_t$ of the operation control section. Thus, if the output current $I_t$, the electrostatic capacity of the timing capacitor $C_t$, and the transfer level of the Schmitt trigger circuit formed by transistors $Q_{19}$, $Q_{10}$, resistors $R_{17}$, $R_{18}$, $R_{19}$, and electromagnet $M_g$ are properly selected so as to be related according to the apex indices, the timing capacitor $C_t$ is charged with a constant current, with the output current $I_t$ being the charging current for timing purposes, commencing with the instant at which the switch $SW_t$ is transferred from the closed to the open position, so that the time required for the Schmitt trigger circuit to respond and deenergize the electromagnet $M_g$ will be a proper exposure time for the particular film which is photographed under the particular conditions, namely the particular light intensity and the selected exposure aperture.

The mechanical operations of a camera which incorporates the electrical circuitry of the invention are for the most part the same as in a conventional camera intended to accomplish similar functions, as pointed out above. In order to initiate the operations which will result in exposure of the film, the operator will depress a shutter-release button, plunger, or the like, so as to set into operation those components which will determine the exposure. The depression of the shutter button will move the switch $SW_p$ from its normally open position to the closed position so as to close the entire electrical circuit means, and immediately thereafter the memory switch $SW_m$ is moved from the closed to the open position just prior to upward movement of the mirror. The result is that the light intensity information stored just before the exposure operations have commenced determines the collector current $I_c$ of the control transistor $Q_{15}$ without any possible influence as a result of the variation of the internal resistance of photosensitive means CdS resulting from the variation of the impinging light as the mirror moves up to the exposure position where the light traveling through the objective will reach the film plane. This collector current $I_c$ is then maintained for the interval required by the shutter operation.

The timing switch $SW_t$ is moved from the open to the closed position in synchronism with the movement of the leading curtain of the focal plane shutter to the shutter-opening position, so that the bypassing of the timing capacitor $C_t$ by the switch $SW_t$ is terminated in synchronism with the opening of the shutter, and thus the constant-current charging of the timing capacitor $C_t$ starts with the charging current $I_t$ simultaneously with the opening of the shutter to achieve the exposure time in accordance with the selected setting of the diaphragm, the film speed, and the light intensity. The Schmitt trigger circuit will automatically respond when the charge of the capacitor means $C_t$ reaches a predetermined level, with the result that the trailing curtain is released by automatic deenergizing of the electromagnet $M_g$ in response to the switching of the Schmitt trigger circuit. The exposure is thus completed, with an exposure time automatically determined in accordance with the factors of diaphragm aperture, film speed, and light intensity. The mirror is restored to its operative position extending across the optical axis of the objective so as to again direct an image to the viewfinder, and the entire mechanism is again restored to its original position. The next unexposed film frame is then transported to the exposure position, and the camera is ready for the next operation, such movement of the film bringing about automatic cocking of the shutter, as is well known.

Thus, in accordance with the invention, particularly with respect to FIGS. 5 and 6 described above, although the operations of the single lens reflex camera take place in a manner similar to known cameras, the electrical circuit means includes the closed loop circuit means, the circuit means including the photosensitive means, with provision of a reference voltage controlled by the control transistor $Q_{15}$ and a diode through an amplifier which includes the holding or retaining circuit, the circuit of the reference voltage being included in the automatic control circuit of the closed loop type with the opposite input voltage terminals of the operation control section corresponding to a circuit for setting the magnitude of the diaphragm aperture and the film speed being respectively formed in combination with a resistor and a logarithmic compression element such as a diode, so that a possible variation of the exposure time due to variation of the voltage source may be effectively compensated, and the influence of temperature variation in the reference voltage is rendered negligible as a result of the use of the automatic circuit of the closed loop type, resulting in an extremely stable photometric storage section. Furthermore, with the invention, the opposite input voltage terminals of the operation control section utilize the voltage across the base and the emitter of the control transistor as the output of the photometric storage section so that the operation control section is effectively arranged by a balanced type of circuit, resulting in realization of an operation control section practically entirely free of any dependency on temperature as well as on source voltage. Thus with the present invention it is possible to provide with the embodiment of FIGS. 5 and 6 an exposure time which is automatically determined with an electrical control circuit means which is of the highest stability and which can be practically manufactured in a highly effective manner so as to be incorporated into single-lens reflex cameras of the through-the-lens photometering type.

What is claimed is:

1. In a camera, electrical circuit means for automatically determining the extent to which film in the camera is exposed, photosensitive means operatively connected to and forming part of said electrical circuit means for introducing into the latter an electrical signal according to the light intensity, and a closed loop circuit means also forming part of and connected with said electrical circuit means for controlling said electrical circuit means to determine the exposure in part according to the light intensity without being influenced by the characteristics of said photosensitive means, said closed loop circuit means including a logarithmic compression section connected in series with said photosensitive means, a logarithmic extension section also connected in series with said photosensitive means, and an amplifier connected between said sections and forming the closed loop circuit means with said logarithmic extension and compression sections, said electrical circuit means including a capacitor means electrically connected with said logarithmic extension section and a means electrically connected with said capacitor means for responding to a predetermined charge on said capacitor means for terminating an exposure, said closed loop circuit means applying to said capacitor means at said logarithmic extension section a constant charging current during exposure of film in the camera.

2. The combination of claim 1 and wherein said logarithmic extension section includes a transistor, a logarithmic compression element, and a voltage bias source all connected in series and said amplifier being electrically connected with said logarithmic extension section for operating as a negative feedback amplifier for controlling collector current of said transistor, said capacitor means being electrically connected in series with a collector of said transistor.

3. The combination of claim 2 and wherein a switch means forms part of said electrical circuit means for transmitting the constant charging current to said capacitor means, so that said switch means may be operated in conjunction with the operation of a mirror of a single lens reflex camera, said switch means being connected in parallel with said capacitor means for bypassing the latter except when said switch means is opened, so that by opening the latter switch means in synchronism with the opening of a shutter of the camera, the charging of said capacitor means can commence simultaneously with the commencement of an exposure.

4. The combination of claim 2 and wherein said logarithmic compression section includes a diode and said logarithmic compression element of said logarithmic extension section also includes a diode, and said amplifier electrically interconnecting said diodes.

5. The combination of claim 4 and wherein said electrical circuit means includes a means for applying to said logarithmic extension section a linear voltage according to the size of the exposure aperture and the film speed, said electrical circuit means automatically determining the exposure time.

6. In a camera, electrical circuit means for automatically determining the extent to which film of the camera is exposed, photosensitive means operatively connected to and forming part of said electrical circuit means for introducing into the latter an electrical signal according to the light intensity, and a closed loop circuit means also forming part of and connected with said electrical circuit means for controlling said electrical circuit means to determine the exposure in part according to the light intensity without being influenced by the characteristics of said photosensitive means, said photosensitive means and said closed loop circuit means forming part of a storage section of said electrical circuit means, said storage section providing a first predetermined output voltage, said electrical circuit means including means for providing a second predetermined output voltage according to a given exposure aperture and film speed, a pair of differential circuit means forming part of said electrical circuit means and operatively connected therewith for receiving said first and second voltages as input voltages, respectively, said pair of differential circuit means providing a given output current, capacitor means forming part of said electrical circuit means to be charged with said latter output current, and said electrical circuit means including a means for terminating an exposure when said capacitor means is charged to a given extent, said storage section including a transistor having a collector circuit in which said photosensitive means is located, said storage section including an amplifier circuit, said means for providing said second predetermined output voltage including a variable resistor and a logarithmic conversion element connected in series therewith, said pair of differential circuit means respectively including two transistors which are symmetrically emitter-coupled with each other, said pair of differential circuit means providing said given output current in the form of a constant-current for charging said capacitor means.

7. The combination of claim 6 and wherein said closed loop circuit means provides reference and control voltages in the circuit of said photosensitive means, and switching transistor means connected in parallel with said photosensitive means for assuming a non-conductive state when said voltages are approximately equal while assuming a conductive state when the difference between said voltages exceeds a predetermined threshold value.

8. The combination of claim 6 and wherein said transistor having its collector circuit containing said photosensitive means provides a collector current in said collector circuit which is inversely proportional to the inner resistance of said photosensitive means.

9. The combination of claim 6 and wherein said first predetermined output voltage forms a base voltage of said transistor which has said photosensitive means in its collector circuit.

10. The combination of claim 6 and wherein at least one logarithmic conversion element is connected in series with the emitter of said transistor in whose collector circuit said photosensitive means is located with the latter logarithmic conversion element being forwardly connected, and said logarithmic conversion element which is in series with said variable resistor also being forwardly connected so that temperature dependency will automatically cancel.

* * * * *

UNITED STATES PATENT OFFICE
CERTIFICATE OF CORRECTION

Patent No. 3,690,230  Dated September 12, 1972

Inventor(s) CHIHARU MORI et al.

It is certified that error appears in the above-identified patent and that said Letters Patent are hereby corrected as shown below:

In item [30] under the heading Foreign Application Priority Data, "44/10331" should be --45/1033--.

Signed and sealed this 1st day of May 1973.

(SEAL)
Attest:

EDWARD M. FLETCHER, JR.      ROBERT GOTTSCHALK
Attesting Officer             Commissioner of Patents